US009893588B2

(12) United States Patent
Makino et al.

(10) Patent No.: US 9,893,588 B2
(45) Date of Patent: Feb. 13, 2018

(54) MOTOR HOUSING WITH COOLING CHANNEL AND RESIN INJECTED WINDING ENDS FOR IMPROVED HEAT TRANSFER

(71) Applicant: NIDEC CORPORATION, Kyoto (JP)

(72) Inventors: Yusuke Makino, Kyoto (JP); Yoshiki Kawai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 843 days.

(21) Appl. No.: 14/258,271

(22) Filed: Apr. 22, 2014

(65) Prior Publication Data
US 2014/0319936 A1    Oct. 30, 2014

(30) Foreign Application Priority Data

Apr. 27, 2013 (JP) .................. 2013-094812

(51) Int. Cl.
*H02K 5/20* (2006.01)
*H02K 5/15* (2006.01)
*H02K 5/12* (2006.01)
*H02K 9/19* (2006.01)
*H02K 9/00* (2006.01)
*H02K 5/16* (2006.01)
*H02K 1/18* (2006.01)
*H02K 15/12* (2006.01)
*H02K 9/22* (2006.01)

(52) U.S. Cl.
CPC .............. *H02K 5/20* (2013.01); *H02K 1/185* (2013.01); *H02K 5/12* (2013.01); *H02K 5/15* (2013.01); *H02K 5/16* (2013.01); *H02K 9/00* (2013.01); *H02K 15/12* (2013.01); *H02K 9/19* (2013.01); *H02K 9/22* (2013.01)

(58) Field of Classification Search
CPC ............ H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/24; H02K 5/00; H02K 5/02; H02K 5/04; H02K 5/06; H02K 5/08; H02K 5/12; H02K 5/15; H02K 5/16; H02K 5/173; H02K 5/20
USPC ........... 310/52, 54, 55, 56, 57, 58, 59, 60 R, 310/60 A, 64, 89, 90, 43; 29/596
See application file for complete search history.

(56) References Cited

U.S. PATENT DOCUMENTS

| | | | | |
|---|---|---|---|---|
| 5,490,319 A | * | 2/1996 | Nakamura | ............... C08K 3/34 |
| | | | | 264/272.11 |
| 5,982,071 A | * | 11/1999 | Ehrick | ..................... H02K 1/30 |
| | | | | 310/216.054 |
| 9,379,589 B2 | * | 6/2016 | Choji | ..................... B60L 11/14 |
| 2003/0173839 A1 | * | 9/2003 | Torii | ..................... H02K 11/33 |
| | | | | 310/52 |

(Continued)

FOREIGN PATENT DOCUMENTS

JP    8-322170 A    12/1996

*Primary Examiner* — Bernard Rojas
*Assistant Examiner* — Alexander Singh
(74) *Attorney, Agent, or Firm* — Cantor Colburn LLP (57) ABSTRACT

A motor includes a housing, a stator holder, a stator, and a flow path for a cooling fluid. The cooling flow path is provided between the housing and the stator holder. A coil of the stator is covered by a resin portion. The stator holder may include a holder cylindrical portion and a holder flat plate portion.

19 Claims, 6 Drawing Sheets

(56) References Cited

U.S. PATENT DOCUMENTS

| | | | |
|---|---|---|---|
| 2005/0074548 A1* | 4/2005 | Puterbaugh | B05D 1/18 427/104 |
| 2008/0030087 A1* | 2/2008 | De Filippis | F04D 25/082 310/58 |
| 2011/0074235 A1* | 3/2011 | Leung | H02K 9/14 310/62 |

* cited by examiner

MOTOR HOUSING WITH COOLING CHANNEL AND RESIN INJECTED WINDING ENDS FOR IMPROVED HEAT TRANSFER

CROSS REFERENCE TO RELATED APPLICATION

The present invention claims priority under 35 U.S.C. § 119 to Japanese Application No. 2013-094812 filed Apr. 27, 2013, the entire contents of which is incorporated herein by reference.

FIELD OF THE INVENTION

The present invention relates to a motor and a method of manufacturing the motor.

BACKGROUND

When drive current is supplied to drive a motor, the coil in the motor generates heat. Therefore, hitherto, various techniques to dissipate heat generated by the coil of a motor to the outside have been proposed. For example, a technique of providing a passage through which cooling water flows in the housing of a motor to dissipate heat generated by the coil to the outside via the cooling water is known.

A motor having a cooling water passage according to the related art is described in, for example, JP-A-8-322170. The motor in JP-A-H08-322170 has a cooling passage in the yoke positioned in the periphery of a stator core (Paragraph 0008, FIG. 1).

In the motor in JP-A-H08-322170, heat generated by a stator winding is conducted to the outside in a radial direction and is transferred to the yoke (Paragraph 0010). In addition, the heat is absorbed by cooling water in the cooling passage provided in the yoke.

However, in the motor in JP-A-H08-322170, the cooling passage is not provided at a position on the outside in the radial direction of the stator winding (FIG. 1). Therefore, the heat generated by the stator winding is conducted to the outside in the radial direction, is further transferred to the inside of the yoke in an axial direction, and reaches the cooling flow path. In this structure, when the amount of heat generated by the stator winding is increased, there is concern that the heat may not be sufficiently conducted from the stator winding to the cooling passage.

SUMMARY

At least an embodiment of the present application includes: a stationary section; a rotating section; and a bearing mechanism which supports the rotating section to rotate relative to the stationary section about a center axis that extends up and down. The stationary section includes a housing which is made of metal and supports the bearing mechanism, a stator holder which is made of metal and is disposed in the housing, a stator which is held in the stator holder, and a flow path for a cooling fluid, which is provided between the housing and the stator holder. The stator includes a stator core which includes a core-back which is annular about the center axis, and a plurality of teeth which extend toward an inside in a radial direction from the core-back, a coil which is made of a conducting wire wound around the teeth, and a resin portion which covers the coil. The housing includes a housing cylindrical portion which is positioned closer to an outside in the radial direction than the stator and is substantially cylindrical while extending in an axial direction, and a housing flat plate portion which widens toward the inside in the radial direction from the housing cylindrical portion on a side upper than the stator, and supports the bearing mechanism. The stator holder includes a holder cylindrical portion which is positioned closer to the outside in the radial direction than the stator and closer to the inside in the radial direction than the housing cylindrical portion, and is substantially cylindrical while extending in the axial direction, and a holder flat plate portion which is positioned on a side upper than the stator and on a side lower than the housing flat plate portion, and widens toward the inside in the radial direction from the holder cylindrical portion. An inner end portion of the holder flat plate portion is positioned closer to the inside in the radial direction than an outer end portion of the coil, an upper surface of the holder flat plate portion and a lower surface of the housing flat plate portion come into contact with each other, and the resin portion comes into contact with a lower surface of the holder flat plate portion.

According to at least an embodiment, a part of heat generated by the coil is absorbed by the cooling fluid in the flow path via the holder cylindrical portion. In addition, another part of the heat generated by the coil is absorbed by the cooling fluid in the flow path via the resin portion, the holder flat plate portion, and the housing. Otherwise, another part of the heat generated by the coil is dissipated to the outside air. As described above, by providing a plurality of heat dissipation paths between the coil and the flow path, heat can be efficiently conducted from the coil to the flow path.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Hereinafter, the exemplary embodiments of the present invention will be described with reference to the drawings.

In addition, in the present application, a direction parallel to the center axis of a motor is referred to as an "axial direction", a direction perpendicular to the center axis of the motor is referred to as a "radial direction", and a direction along the arc about the center axis of the motor is referred to as a "circumferential direction". In addition, in the present application, the shape and positional relationship of each part will be described assuming that the axial direction means the up and down direction and a housing flat plate portion side with respect to a stator is an upward side. However, when being manufactured and used, the definition of the up and down direction is not intended to limit the direction of the motor according to the present invention.

In addition, in the present application, an end portion on the inside in the radial direction and an end portion on the outside in the radial direction are simply referred to as an "inner end portion" and an "outer end portion," respectively. In addition, a "parallel direction" in the present application also includes a substantially parallel direction. In addition, a "perpendicular direction" in the present application also includes a substantially perpendicular direction.

1. First Embodiment

Figure 1:
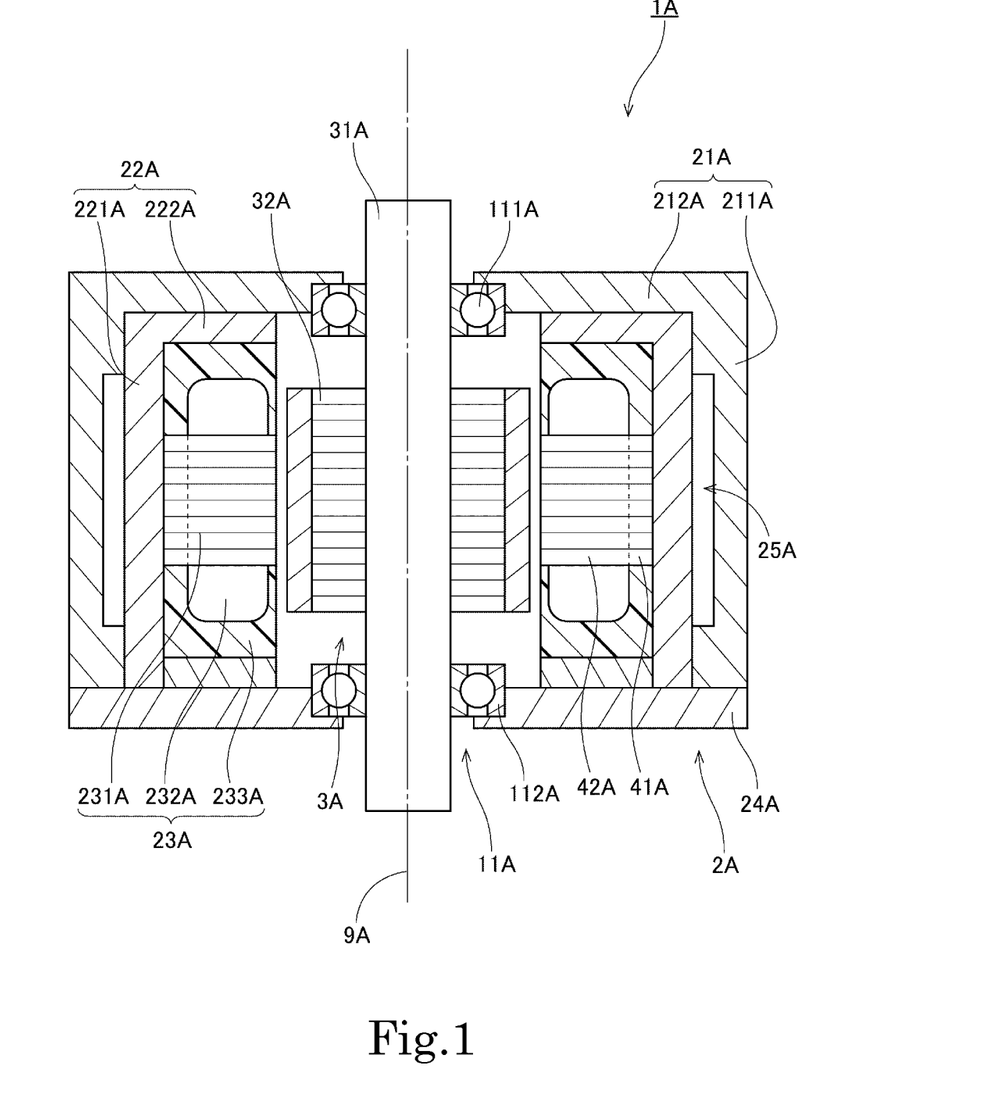
FIG. 1 is a longitudinal sectional view of a motor according to a first embodiment.

FIG. 1 is a longitudinal sectional view of a motor 1A according to a first embodiment of the present invention. The motor 1A in this embodiment is a so-called inner rotor type motor in which a rotor 32A is disposed on the inside of a stator 23A in the radial direction. As illustrated in FIG. 1, the motor 1A includes a stationary section 2A, a rotating section 3A, and a bearing mechanism 11A.

The stationary section 2A includes a housing 21A, a stator holder 22A, the stator 23A, a cover 24A, and a flow path 25A.

The housing 21A is a member made of metal, which holds the stator holder 22A. The housing 21A includes a housing cylindrical portion 211A and a housing flat plate portion 212A. The housing cylindrical portion 211A is positioned closer to the outside in the radial direction than the stator 23A and is substantially cylindrical while extending in an axial direction. The housing flat plate portion 212A is positioned on the side upper than the stator 23A and widens toward the inside in the radial direction from the housing cylindrical portion 211A. The opening of the lower portion of the housing 21A is closed by a cover 24A.

The stator holder 22A is a member made of metal, which is disposed inside the housing 21A. The stator holder 22A has a holder cylindrical portion 221A and a holder flat plate portion 222A. The holder cylindrical portion 221A is positioned closer to the outside in the radial direction than the stator 23A and closer to the inside in the radial direction than the housing cylindrical portion 211A and is substantially cylindrical while extending in the axial direction. The holder flat plate portion 222A is positioned closer to the upper side than the stator 23A and closer to the lower side than the housing flat plate portion 212A and widens toward the inside in the radial direction from the holder cylindrical portion 221A.

The stator 23A is an armature held in the stator holder 22A. The stator 23A includes a stator core 231A, a coil 232A, and a resin portion 233A. The stator core 231A includes a core-back 41A which is annular about a center axis 9A, and a plurality of teeth 42A which extend toward the inside in the radial direction from the core-back 41A. The coil 232A is made of a conducting wire wound around the teeth 42A. In addition, the coil 232A is covered with the resin portion 233A.

The rotating section 3A includes a shaft 31A and a rotor 32A. The shaft 31A extends along the center axis 9A that extends up and down. The rotor 32A is disposed in the periphery of the shaft 31A and is fixed to the shaft 31A.

The bearing mechanism 11A supports the rotating section 3A to rotate relative to the stationary section 2A about the center axis 9A. The bearing mechanism 11A in this embodiment is configured to have an upper bearing mechanism 111A and a lower bearing mechanism 112A. The upper bearing mechanism 111A is supported by the housing flat plate portion 212A. The lower bearing mechanism 112A is supported by the cover 24A. In addition, the shaft 31A is supported by the upper bearing mechanism 111A and the lower bearing mechanism 112A so as to rotate.

The flow path 25A is provided between the housing 21A and the stator holder 22A. During the driving of the motor 1A, a cooling fluid flows in the flow path 25A. A part of heat generated by the coil 232A is conducted to the holder cylindrical portion 221A via the resin portion 233A positioned on the outside of the coil 232A in the radial direction or the stator core 231A. In addition, the heat is absorbed by the cooling fluid in the flow path 25A from the holder cylindrical portion 221A.

The flow path 25A is provided between the housing cylindrical portion 211A and the holder cylindrical portion 221A. In addition, in the housing cylindrical portion 211A, an inlet port and an outlet port (not illustrated) are provided. The flow path 25A allows the inlet port and the outlet port to be connected with the flow path. During the driving of the motor 1A, the cooling fluid which is a heat medium flows from the inlet port to the outlet port through the flow path 25A. The cooling fluid absorbs heat from the housing 21A and the stator holder 22A. As the cooling fluid, for example, water is used. However, instead of water, other liquids such as an oil and ethylene glycol or gas such as the air may be used as the cooling fluid.

In addition, as illustrated in FIG. 1, in the motor 1A, the inner end portion of the holder flat plate portion 222A is positioned closer to the inside in the radial direction than the inner end portion of the coil 232A. In addition, the lower surface of the holder flat plate portion 222A and the resin portion 233A come into contact with each other so that the contact area therebetween is maximized. In addition, the upper surface of the holder flat plate portion 222A and the lower surface of the housing flat plate portion 212A come into contact with each other.

Therefore, another part of the heat generated by the coil 232A is conducted to the housing flat plate portion 212A via the resin portion 233A and the holder flat plate portion 222A. In addition, the heat is absorbed by the cooling fluid in the flow path 25A from the housing 21A or is dissipated to the outside air.

In addition, since the stator holder 22A has the holder flat plate portion 222A, the heat exchange area between the resin portion 233A and the stator holder 22A is widened. Therefore, the heat generated by the coil 232A is efficiently conducted to the holder flat plate portion 222A via the resin portion 233A. In addition, the inner end portion of the holder flat plate portion 222A is not necessarily positioned closer to the inside in the radial direction than the inner end portion of the coil 232A. The inner end portion of the holder flat plate portion 222A may be positioned at least closer to the inside in the radial direction than the outer end portion of the coil 232A. Accordingly, the lower surface of the holder flat plate portion 222A and the resin portion 233A come into contact with each other on the upper side of at least a part of the coil 232A. Therefore, the heat can be efficiently conducted from the coil 232A to the flow path 25A via the holder flat plate portion 222A. Particularly, the heat generated by the inner end portion side of the coil 232A may be conducted to the flow path 25A positioned closer to the outside in the radial direction than the coil 232A.

As described above, in the motor 1A, a plurality of heat dissipation paths are provided between the coil 232A and the flow path 25A, and thus a sufficient heat exchange area is secured. Therefore, heat can be efficiently conducted from the coil 232A to the flow path 25A.

2. Second Embodiment

<2-1. Overall Configuration of Motor>

Figure 2:
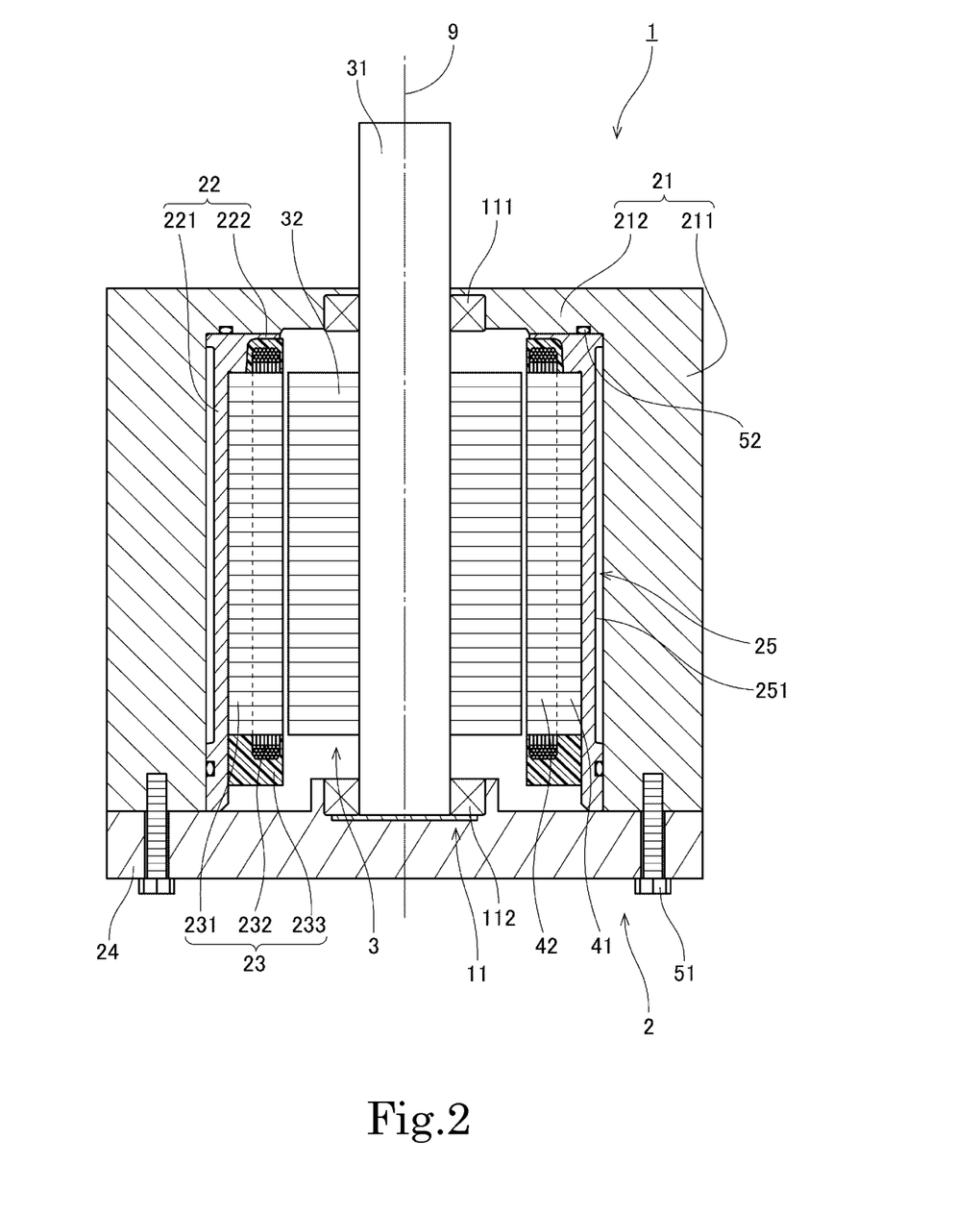
FIG. 2 is a longitudinal sectional view of a motor according to a second embodiment.

Next, a second embodiment will be described. FIG. 2 is a longitudinal sectional view of a motor 1 according to the second embodiment. The motor 1 is used as, for example, a drive main motor of a vehicle. The main motor of the vehicle particularly generates a large amount of heat among the motors mounted in the vehicle, and thus at least an embodiment of the present invention is useful. However, the motor 1 may also be used as a drive source of a power steering, a cooling fan, or the like of a vehicle. In addition, the motor 1 may also be mounted in office automation equipment, medical instruments, large industrial facilities, and the like.

As illustrated in FIG. 2, the motor 1 includes a stationary section 2, a rotating section 3, and a bearing mechanism 11.

The stationary section 2 in this embodiment includes a housing 21, a stator holder 22, a stator 23, a cover 24, and a flow path 25.

The housing 21 is a case which accommodates the stator holder 22, the stator 23, and a rotor 32 which will be described later. The housing 21 is formed of metal such as aluminum. The housing 21 includes a housing cylindrical portion 211 and a housing flat plate portion 212. The housing cylindrical portion 211 is positioned closer to the outside in the radial direction than the stator 23 and is substantially cylindrical while extending in an axial direction. The housing flat plate portion 212 widens toward the inside in the radial direction from the upper end of the housing cylindrical portion 211. The housing flat plate portion 212 is positioned on the upper side of the stator 23. In addition, the housing flat plate portion 212 supports an upper bearing mechanism 111, which will be described later, in the vicinity of the inner end portion thereof.

The stator holder 22 is disposed inside the housing 21 and holds the stator 23. The stator holder 22 is formed of metal such as aluminum. The stator holder 22 has a holder cylindrical portion 221 and a holder flat plate portion 222. The holder cylindrical portion 221 is positioned closer to the outside in the radial direction than the stator 23 and closer to the inside in the radial direction than the housing cylindrical portion 211. In addition, the holder cylindrical portion 221 is substantially cylindrical while extending in the axial direction. The outer circumferential surface of the holder cylindrical portion 221 is provided with a flow path groove 251 that forms a flow path 25. The holder flat plate portion 222 is positioned closer to the upper side than the stator 23 and closer to the lower side than the housing flat plate portion 212. In addition, the holder flat plate portion 222 widens toward the inside in the radial direction from the upper end of holder cylindrical portion 221.

The stator 23 is an armature which generates a magnetic flux according to drive current. The stator 23 includes a stator core 231, a coil 232, and a resin portion 233.

The stator core 231 is made of a laminated steel sheet in which an electronic steel sheet is laminated in the axial direction. The stator core 231 includes a core-back 41 which is annular about a center axis 9, and a plurality of teeth 42 which extend toward the inside in the radial direction from the core-back 41. The outer circumferential surface of the core-back 41 is fixed to the inner circumferential surface of the holder cylindrical portion 221.

The coil 232 is made of a conducting wire wound around the teeth 42. In this embodiment, the conducting wire that forms the coil 232 is disposed in multiple layers in the periphery of the teeth 42. In addition, insulating paper is interposed between the coil 232 and the teeth 42. Accordingly, an electrical short circuit between the coil 232 and the teeth 42 is prevented. Otherwise, instead of the insulating paper, insulating paint may be applied to the surface of the teeth 42. In addition, instead of the insulating paper, an insulator made of a resin may be interposed between the coil 232 and the teeth 42.

The resin portion 233 is made of a resin which has a higher thermal conductivity than the air and is an insulating material. The resin portion 233 covers the coil 232. The resin portion 233 in this embodiment is molded by disposing the stator core 231 and the coil 232 inside the stator holder 22 and thereafter pouring a molding material into the stator holder 22. The resin portion 233 comes into contact with the lower surface of the holder flat plate portion 222. The resin portion 233 is interposed between prevents the coil 232 and the stator holder 22 from being electrically short-circuited by being interposed therebetween. In addition, the resin portion 233 conducts heat generated by the coil 232 to the stator holder 22.

The cover 24 is a substantially flat plate-shaped member having a circular hole at the center. The opening of the lower portion of the housing 21 is closed by the cover 24. In this embodiment, the cover 24 is fixed to the housing 21 by a screw 51 which is a fastening member. In addition, the cover 24 supports a lower bearing mechanism 112, which will be described later, in the vicinity of substantially the center thereof.

The flow path 25 is provided between the housing cylindrical portion 211 and the holder cylindrical portion 221. In addition, in the housing cylindrical portion 211, an inlet port and an outlet port (not illustrated) are provided. The flow path 25 allows the inlet port and the outlet port to be connected with the flow path. During the driving of the motor 1, a cooling fluid which is a heat medium flows from the inlet port to the outlet port through the flow path 25. The cooling fluid absorbs heat from the housing 21 and the stator holder 22. As the cooling fluid, for example, water is used. However, instead of water, other liquids such as an oil and ethylene glycol or gas such as the air may be used as the cooling fluid.

The flow path 25 widens in the circumferential direction between the housing cylindrical portion 211 and the holder cylindrical portion 221 and surrounds the coil 232 which is a heat source. Accordingly, an efficiency of dissipating heat from the coil 232 to the cooling fluid is increased.

Particularly, the flow path 25 in this embodiment is formed between the outer circumferential surface of the holder cylindrical portion 221 where the flow path groove 251 is provided, and the inner circumferential surface of the housing cylindrical portion 211. Therefore, compared to a case where the flow path groove is provided on the housing cylindrical portion 211, the distance between the coil 232 and the flow path 25 is short. Accordingly, heat can be more efficiently conducted to the cooling fluid in the flow path 25 from the coil 232.

The rotating section 3 in this embodiment includes a shaft 31 and a rotor 32.

The shaft 31 is a columnar member that is disposed along the center axis 9 that extends up and down. The shaft 31 rotates about the center axis 9 while being supported by the bearing mechanism 11. As illustrated in FIG. 2, the upper end portion of the shaft 31 protrudes upward from the upper surface of the housing flat plate portion 212. The upper end portion of the shaft 31 is connected to a drive section via a power transmission mechanism such as a gear.

The rotor 32 is fixed to the shaft 31 to rotate along with the shaft 31. The rotor 32 is made of, for example, a laminated steel sheet in which an electronic steel sheet is laminated. In addition, the rotor 32 includes a plurality of teeth that protrude toward the outside in the radial direction. The motor 1 in this embodiment is a switched reluctance motor (SR motor) in which the rotor 32 does not have a magnet. However, the motor may be an IPM motor or an SPM motor in which the rotor has a magnet.

The bearing mechanism 11 supports the rotating section 3 to rotate relative to the stationary section 2 about the center axis 9. The bearing mechanism 11 is configured to have an upper bearing mechanism 111 and a lower bearing mechanism 112. The upper bearing mechanism 111 is on the upper side of the rotor 32 and supports the shaft 31 to rotate. The lower bearing mechanism 112 is on the upper side of the rotor 32 and supports the shaft 31 to rotate.

As the bearing mechanism 11, for example, a ball bearing in which the outer race and the inner race rotate relative to each other via spherical bodies is used. However, instead of the ball bearing, other types of bearings such as a slide bearing and a fluid bearing may also be used.

In the motor 1, when drive current is supplied to the coil 232, the plurality of teeth 42 of the stator core 231 generate a magnetic flux. In addition, due to the magnetic attraction between the teeth 42 of the stator core 231 and the teeth of the rotor 32, a torque in the circumferential direction is generated. As a result, the rotating section 3 rotates relative to the stationary section 2 about the center axis 9.

<2-2. Dissipation Path of Heat Generated by Coil>

During the driving of the motor 1, since current flows through the coil 232, the coil 232 generates heat. Hereinafter, a dissipation path of the heat generated by the coil 232 will be described.

Figure 3:
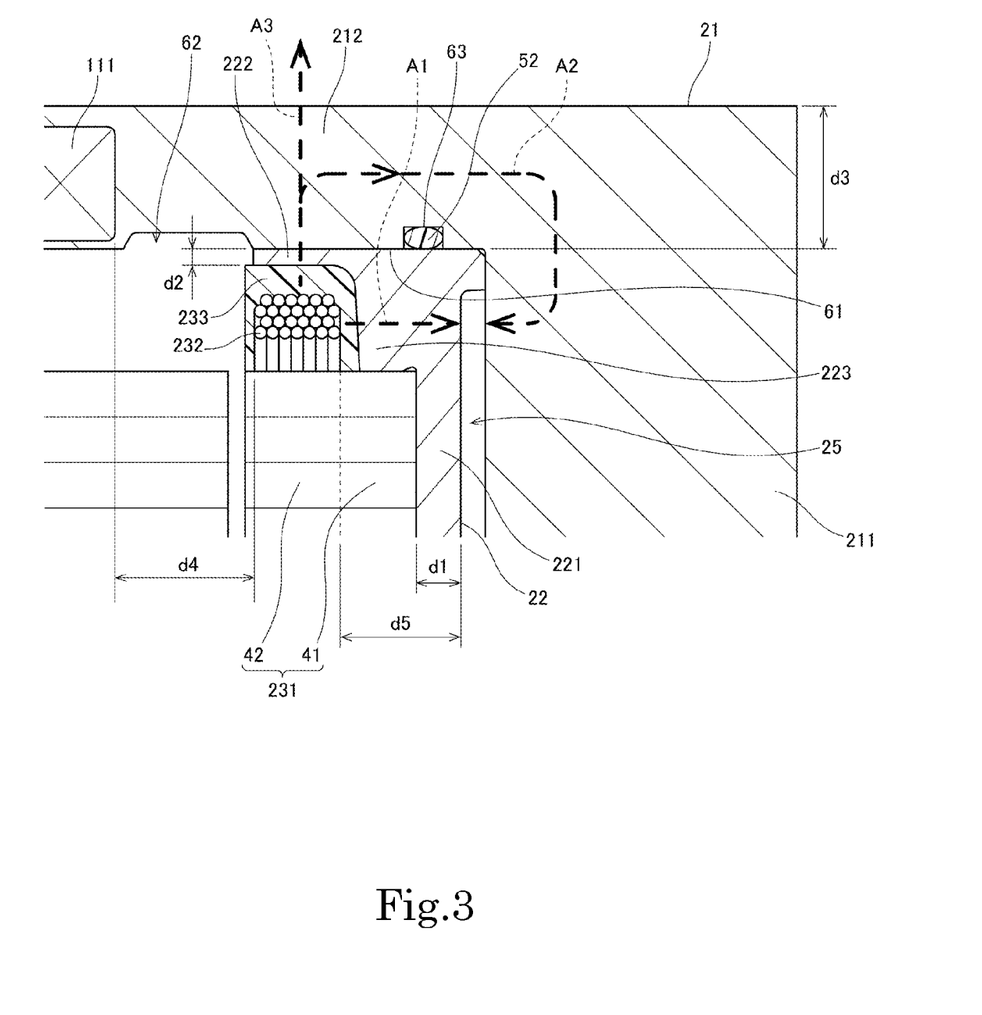
FIG. 3 is a partial sectional view of the motor according to the second embodiment.

FIG. 3 is a partial sectional view of the motor 1. In FIG. 3, the dissipation path of the heat generated by the coil 232 is indicated by the arrows with broken lines. As indicated by the arrow A1 with the broken line in FIG. 3, a part of the heat generated by the coil 232 is conducted to the outside in the radial direction from the coil 232. That is, the heat is conducted to the flow path 25 from the coil 232 via the resin portion 233 and the holder cylindrical portion 221 and is absorbed by the cooling fluid in the flow path 25.

In addition, the inner end portion of the holder flat plate portion 222 is positioned closer to the inside in the radial direction from the outer end portion of the coil 232. In addition, the resin portion 233 comes into contact with both the lower surface of the holder flat plate portion 222 and the coil 232. Furthermore, the upper surface of the holder flat plate portion 222 and the lower surface of the housing flat plate portion 212 come into contact with each other. Therefore, as indicated by the arrows A2 and A3 with the broken lines in FIG. 3, another part of the heat generated by the coil 232 is conducted to the housing flat plate portion 212 via the resin portion 233 and the holder flat plate portion 222. Thereafter, as another part of the heat additionally passes through the housing cylindrical portion 211 from the housing flat plate portion 212 and is absorbed by the cooling fluid in the flow path 25 as indicated by the arrow A2 with the broken line. As described above, in the motor 1 in this embodiment, a plurality of heat dissipation paths are provided between the coil 232 and the flow path 25. Therefore, heat can be efficiently conducted from the coil 232 to the flow path 25.

In addition, another part of the heat conducted to the housing flat plate portion 212 is dissipated to the outside air from the upper surface of the housing flat plate portion 212 as indicated by the arrow A3 with the broken line. In a case where another component is mounted to the upper surface of the housing flat plate portion 212, if the thermal conductivity of the component is greater than the air, the efficiency of thermal conduction from the housing flat plate portion to the component is further increased.

It is preferable that the inner end portion of the holder flat plate portion 222 be positioned at the same position in the radial direction as that of the inner end portion of the coil 232 or be positioned closer to the inside in the radial direction than the inner end portion of the coil 232. In this case, the entirety of the upper surface of the coil 232 is covered by the holder flat plate portion 222. Therefore, the contact area between the resin portion 233 and the holder flat plate portion 222 is increased, and thus the heat generated by the coil 232 can be more efficiently conducted to the holder flat plate portion 222 via the resin portion 233.

Particularly, in this embodiment, the inner end portion of the holder flat plate portion 222 is positioned closer to the inside in the radial direction than the end portion of the conducting wire on the inside in the radial direction, which is wound around the closest layer of the upper surface of the coil 232 to the holder flat plate portion 22. Therefore, the area where the axial distance between the coil 232 and the holder flat plate portion 222 is minimized can be maximized. As a result, the heat generated by the coil 232 can be efficiently conducted to the holder flat plate portion 222.

As illustrated in FIG. 3, the lower surface of the housing flat plate portion 212 includes a cut surface 61, a concave portion 62, and an annular groove 63. The cut surface 61 is a flat surface which is formed by cutting and has good accuracy. The cut surface 61 comes into contact with the upper surface of the holder flat plate portion 222. The concave portion 62 is positioned closer to the inside in the radial direction than the cut surface 61 and is recessed upward from the cut surface 61. The concave portion 62 is provided to enhance workability when the cut surface 61 is subjected to the cutting. That is, when the concave portion 62 is present, the area to be cut during the cutting is reduced. Therefore, it becomes easier to cut a part that needs to be cut into the cut surface 61 from the lower surface of the housing flat plate portion 212.

The annular groove 63 is a substantially annular hole which is recessed upward from the cut surface 61. The annular groove 63 accommodates an O-ring 52 made of an elastomer. The O-ring 52 is interposed between the lower surface of the housing flat plate portion 212 and the upper surface of the holder cylindrical portion 221 or the holder flat plate portion 222. Accordingly, the cooling fluid in the flow path 25 is suppressed from leaking into the space closer to the inside in the radial direction than the stator 23 in the motor 1. That is, the cooling fluid can be reliably confined in the flow path 25. Therefore, heat can be more efficiently conducted to the housing flat plate portion 212 from the holder flat plate portion 222. In addition, in a case where the cooling fluid is water, since the cooling fluid is suppressed from leaking into the space closer to the inside in the radial direction than the stator 23, a short circuit of the coil 232 or rust prevention of the stator core 231 or the rotor 32 can be achieved.

In addition, the O-ring 52 may be interposed between the housing cylindrical portion 211 and the holder cylindrical portion 221 on the side upper than the upper end portion of the flow path 25.

In addition, in this embodiment, the upper surface of the holder flat plate portion 222 is also a cut surface. In addition, the corresponding upper surface of the holder flat plate portion 222 comes into contact with the cut surface 61 of the housing flat plate portion 212. As such, it is preferable that the cut surfaces of the lower surface of the housing flat plate portion 212 and the upper surface of the holder flat plate portion 222 face each other in the axial direction and come into close contact with each other. However, at least a portion of the cut surface 61 of the housing flat plate portion 212 and a portion of the cut surface of the holder flat plate portion 222 may come into contact with each other. In this case, the flat surfaces having good accuracy come into contact with each other, and thus a microscopic contact area between the housing flat plate portion 212 and the holder flat plate portion 222 is increased, resulting in a so-called close contact state. Accordingly, heat can be more efficiently conducted to the housing flat plate portion 212 from the holder flat plate portion 222.

In this embodiment, the dimensions of the stator holder 22 in the axial direction, that is, the dimensions from the upper surface of the holder flat plate portion 222 to the lower end portion of the holder cylindrical portion 221 are slightly greater than the dimensions of the housing cylindrical portion 211 in the axial direction, that is, the dimensions from the cut surface 61 to the lower end portion of the housing cylindrical portion 211 in the axial direction. Therefore, when the cover 24 is fastened to the housing cylindrical portion 211, the upper surface of the cover 24 and the lower end portion of the holder cylindrical portion 221 come into contact with each other. Accordingly, the upper surface of the holder flat plate portion 222 is pressed against the lower surface of the housing flat plate portion 212 and the surfaces come into close contact with each other. As a result, heat can be more efficiently conducted to the housing flat plate portion 212 from the holder flat plate portion 222.

In addition, to have the lower surface of the housing flat plate portion 212 and the upper surface of the holder flat plate portion 222 come into close contact with each other, other methods than fastening may also be used. For example, the motor 1 is disposed vertically along the axis, and using the weight of the motor 1 itself, the lower surface of the housing flat plate portion 212 and the upper surface of the holder flat plate portion 222 may be caused to come into close contact with each other.

In addition, when the holder flat plate portion 222 is pressed against the housing flat plate portion 212, the O-ring 52 is squeezed in the axial direction. Accordingly, the effect of the O-ring 52 sealing between the housing flat plate portion 212 and the holder flat plate portion 222 is increased. That is, the cooling fluid can be further suppressed from leaking toward the inside of the O-ring 52 in the radial direction from the outside of the O-ring 52 in the radial direction.

In addition, as illustrated in FIG. 3, in this embodiment, an axial thickness d2 of the holder flat plate portion 222 is smaller than a radial thickness d1 of the holder cylindrical portion 221. Therefore, compared to a case where the thickness d2 is greater than the thickness d1, conduction of heat via the holder flat plate portion 222 is efficiently performed. That is, heat can be more efficiently conducted to the housing flat plate portion 212 from the resin portion 233 via the holder flat plate portion 222.

In addition, in this embodiment, an axial thickness d3 of the housing flat plate portion 212 is greater than an axial thickness d2 of the holder flat plate portion 222. Accordingly, the heat conduction path through the housing flat plate portion 212, which is indicated by the arrow A2 with the broken line, is widened, and a larger amount heat can be conducted to the cooling fluid via the housing flat plate portion 212. Therefore, heat can be more efficiently conducted to housing cylindrical portion 211 from the holder flat plate portion 222 via the housing flat plate portion 212.

In addition, as illustrated in FIG. 3, the holder cylindrical portion 221 in this embodiment includes a protrusion 223 which protrudes inward in the radial direction from the upper end portion thereof. The protrusion 223 is positioned on the stator core 231 and under the holder flat plate portion 222. Accordingly, the radial distance between the outer end portion of the coil 232 and the holder cylindrical portion 221 can be reduced. In addition, since the protrusion 223 is present, the volume of the resin portion 233 which is interposed between the coil 232 and the holder cylindrical portion 221 is reduced. The protrusion 223 is formed of metal having a high thermal conductivity than resin. Therefore, compared to a case where a part corresponding to the protrusion 223 is formed of resin, heat can be more efficiently conducted to the holder cylindrical portion 221 from the coil 232.

In addition, in this embodiment, the upper surface of the stator core 231 and the lower surface of the protrusion 223 come into contact with each other. Accordingly, the stator core 231 is positioned in the axial direction with respect to the stator holder 22 by the lower surface of the protrusion 223 which is the reference. As a result, the axial distance between the upper surface of the coil 232 and the lower surface of the holder flat plate portion 222 is appropriately determined. Therefore, heat can be efficiently conducted to the holder flat plate portion 222 from the coil 232 while preventing a short circuit between the coil 232 and the holder flat plate portion 222. In addition, since the resin portion 233 is not interposed between the stator core 231 and the protrusion 223, the volume of the resin portion 233 between the coil 232 and the holder cylindrical portion 221 is further reduced. Therefore, heat can be further efficiently conducted to the holder cylindrical portion 221 from the coil 232.

In addition, in this embodiment, the inside diameter of the protrusion 223 of the stator holder 22 is greater than or equal to the inside diameter of the core-back 41 of the stator core 231. Therefore, the protrusion 223 does not block the opening of the upper portion of a space between the adjacent teeth 42. Accordingly, the space factor of the coil 232 is increased, and thus the motor 1 can be made compact. In addition, in this embodiment, the inner circumferential surface of the protrusion 223 and the lower surface of the holder flat plate portion 222 are connected to each other with a curved surface. Accordingly, the stator holder 22 can be easily molded.

As illustrated in FIGS. 2 and 3, the housing flat plate portion 212 comes into contact with the outer circumferential surface of the upper bearing mechanism 111. In addition, the upper bearing mechanism 111 is positioned closer to the inside in the radial direction than the coil 232. In contrast, the flow path 25 is positioned closer to the outside in the radial direction than the coil 232. In this embodiment, a radial distance d4 between the outer circumferential surface of the upper bearing mechanism 111 and the coil 232 is longer than a radial distance d5 between the coil 232 and the flow path 25. Therefore, heat generated by the coil 232 is easily conducted to the flow path 25 from the upper bearing mechanism 111. Accordingly, the heat generated by the coil 232 can be more efficiently absorbed by the cooling fluid in the flow path 25. In addition, the heat generated by the coil 232 is suppressed from being conducted to the bearing mechanism 111 and adversely affecting the life span of the bearing mechanism 111.

In addition, in this embodiment, the upper end portion of the flow path 25 is positioned closer to the upper side than the upper surface of the stator core 231. That is, parts of the coil 232 and the flow path 25 overlap in the radial direction. Accordingly, the distance from the coil 232 to the flow path 25 is reduced. Therefore, the heat generated by the coil 232 can be more efficiently absorbed by the cooling fluid in the flow path 25.

In addition, to increase the efficiency of thermal conduction from the coil 232 to the stator holder 22, it is preferable that the radial distance between the coil 232 and the holder cylindrical portion 221 and the axial distance between the coil 232 and the holder flat plate portion 222 approach each other. However, when the distances approach each other too close, insulation between the coil 232 and the stator holder 22 cannot be maintained. Considering this, the radial distance between the coil 232 and the holder cylindrical portion 221 and the axial distance between the coil 232 and the holder flat plate portion 222 be greater than or equal to the minimum insulation distance specified in the well-known standards.

<2-3. Manufacturing Procedure of Motor>

Figure 4:
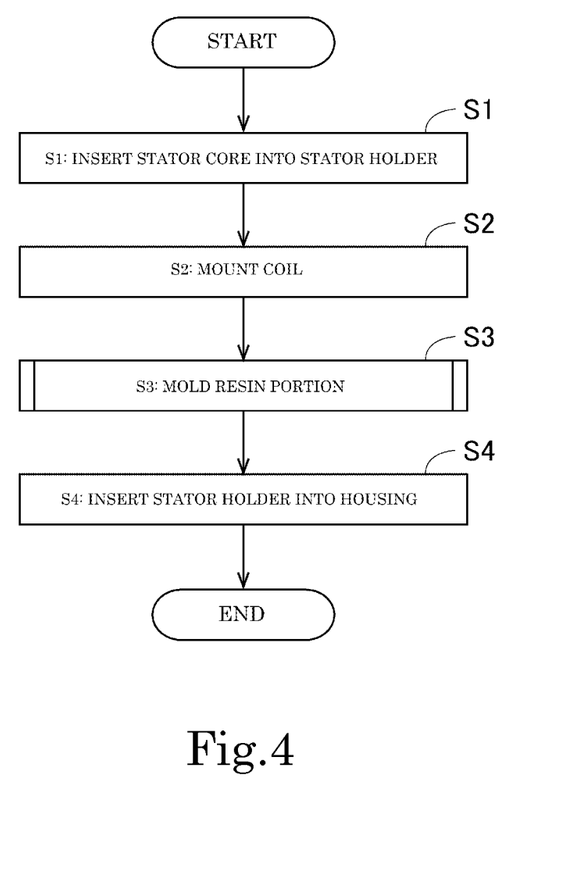
FIG. 4 is a diagram illustrating a flow of manufacturing the motor according to the second embodiment.

FIG. 4 is a flowchart illustrating a part of manufacturing processes of the motor 1 described above. Hereinafter, among the manufacturing processes of the motor 1, an assembly procedure of the housing 21, the stator holder 22, and the stator 23 will be described with reference to FIG. 4.

In the example of FIG. 4, first, the stator core 231 is inserted into the stator holder 22 (Step S1). Specifically, the stator core 231 is inserted from the lower side of the heated stator holder 22 toward the inside of the holder cylindrical portion 221. In addition, the upper surface of the stator core 231 is caused to come into contact with the lower surface of the protrusion 223 of the stator holder 22. Accordingly, the stator core 231 can be positioned in the axial direction with respect to the stator holder 22. Thereafter, by cooling the stator holder 22, the stator holder 22 and the stator core 231 are fixed to each other.

As such, in this embodiment, the stator holder 22 and the stator core 231 are fixed to each other by shrink-fitting. However, the stator holder 22 and the stator core 231 may also be fixed to each other by press-fitting or adhesion.

Next, the coil 232 is mounted to each of the teeth 42 of the stator core 231 (Step S2). Specifically, after mounting the insulating paper to the teeth 42, the coil 232 which is formed in an annular shape in advance is mounted to the teeth 42. Otherwise, insulating paint may be applied to the surface of the teeth 42 instead of the insulating paper. In addition, an insulator made of a resin may also be mounted to the teeth 42 instead of the insulating paper.

In addition, the mounting of the coil 232 in Step S2 may also be performed before Step S1. That is, the stator core 231 to which the coil 232 is mounted may be inserted into the stator holder 22.

Subsequently, the molding material is injected between the stator core 231 and the coil 232, and the stator holder 22 and is allowed to solidify, thereby molding the resin portion 233 (Step S3). Accordingly, the coil 232 is covered by the resin portion 233 and the resin portion 233 is allowed to come into close contact with the lower surface of the holder flat plate portion 222. Details of Step S3 will be described later.

Thereafter, the stator holder 22 is inserted into the housing 21 along with the stator 23 (Step S4). At this time, the upper bearing mechanism 111 is mounted to the housing 21. In addition, the O-ring 52 is disposed in the annular groove 63 of the lower surface of the housing flat plate portion 212.

As described above, in the manufacturing method in this embodiment, after the resin portion 233 is molded in Step S3, the stator holder 22 is inserted into the housing 21 in Step S4. During the molding of the resin portion 233, since the housing 21 and the upper bearing mechanism 111 are not present, the molding work is easily performed. In addition, there is no concern for the resin adhering to the vicinity of the upper bearing mechanism 111. In addition, in the state where the O-ring 52 is disposed in the annular groove 63 of the lower surface of the housing flat plate portion 212, the stator holder 22 may be inserted into the housing 21.

<2-4. Molding Procedure of Resin Portion>

Figure 5:
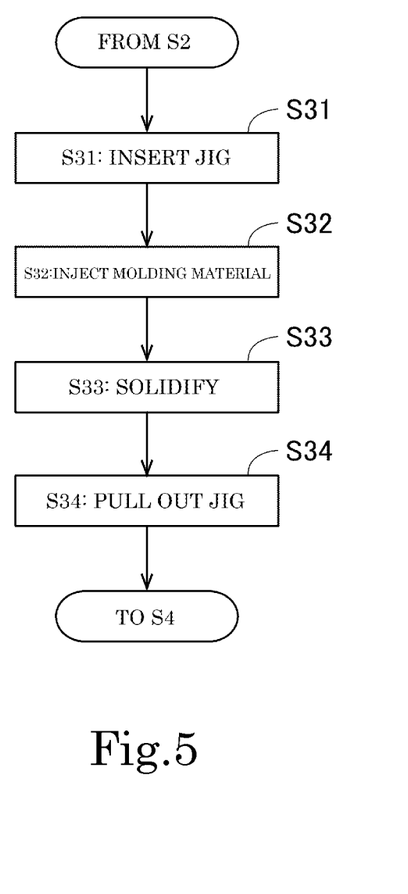
FIG. 5 is a diagram illustrating a flow of manufacturing a resin portion according to the second embodiment.
Figure 6:
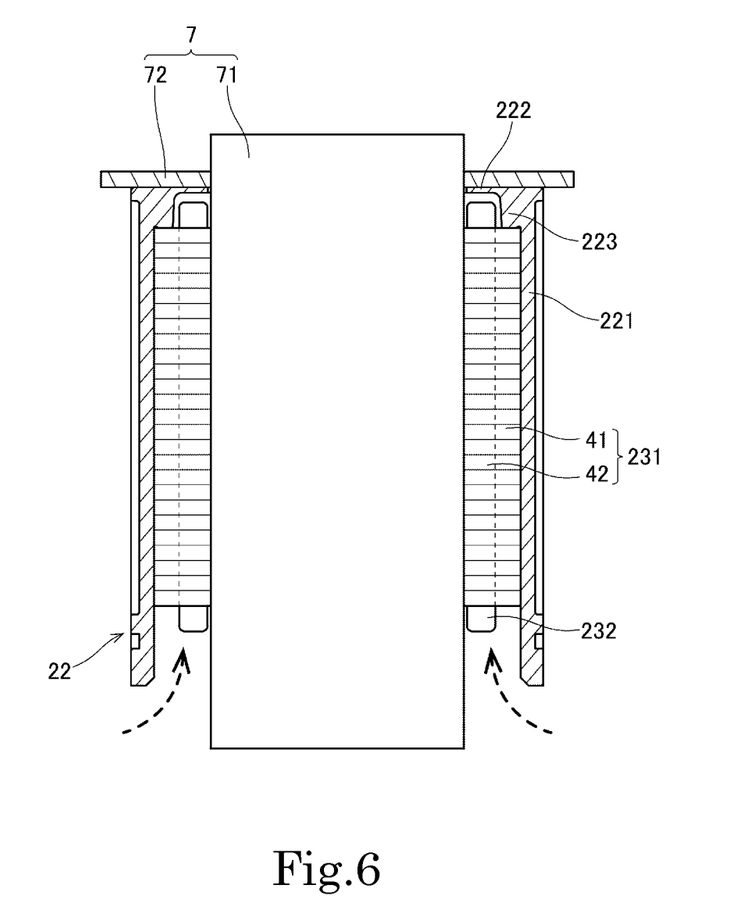
FIG. 6 is a diagram illustrating a form of a manufacturing procedure of the resin portion according to the second embodiment.

Next, a molding procedure of the resin portion 233 in Step S3 described above will be described with reference to FIGS. 5 and 6. FIG. 5 is a flowchart showing the molding procedure of the resin portion 233. FIG. 6 is a diagram illustrating a form during the molding of the resin portion 233. In addition, in FIG. 6, the stator core 231, the coil 232, and the stator holder 22 are drawn in directions that follow the definition of the up and down direction in the present application. However, during the injection of the molding material, the stator core 231, the coil 232, and the stator holder 22 are disposed in a reverse direction to the up and down direction.

In the example of FIG. 5, first, a jig 7 is inserted into the stator holder 22 to which the stator core 231 and the coil 232 are mounted (Step S31). As illustrated in FIG. 6, the jig 7 in this embodiment is configured to have a first jig 71 which has a substantially columnar shape and a second jig 72 which has a plate shape. The outside diameter of the first jig 71 is substantially the same as the inside diameter of the teeth 42 of the stator core 231. The first jig 71 is inserted toward the inside of the teeth 42 in the radial direction. Accordingly, the molding material is suppressed from turning to and flowing into the inside of the teeth 42 in the radial direction. In addition, the inner end surface of the resin portion 233 is molded by the outer circumferential surface of the first jig 71. As a result, as illustrated in FIG. 3, the radial position of the inner end portion of the teeth 42 and the radial position of the inner end portion of the resin portion 233 are substantially the same.

The second jig 72 widens substantially perpendicularly to the center axis 9 in the periphery of the first jig 71. The second jig 72 is disposed on the upper surface of the holder flat plate portion 222. Accordingly, the molding material is suppressed from turning to and flowing into the upper side of the holder flat plate portion 222 from between the inner end portion of the holder flat plate portion 222 and the outer circumferential surface of the first jig 71. Otherwise, instead of the second jig 72, a sealing member may be disposed between the inner end portion of the holder flat plate portion 222 and the outer circumferential surface of the first jig 71 so as to prevent the leakage of the molding material.

Next, the molding material is injected into a space surrounded by the stator core 231, the coil 232, the stator holder 22, and the jig 7 as indicated by the arrow with the broken line in FIG. 6 (Step S32). As the molding material, for example, a thermosetting resin such as an epoxy may be used. In addition, it is preferable that during the injection of the molding material, a work space in which the stator core 231, the coil 232, the stator holder 22, and the jig 7 are disposed be decompressed to remove bubbles from the molding material.

Subsequently, the stator core 231, the coil 232, the stator holder 22, and the jig 7 are disposed in a thermostat bath to cause the molding material to solidify (Step S33). Accordingly, the resin portion 233 is obtained.

Thereafter, the jig 7 is pulled out from the stator holder 22, the stator 23, and the resin portion 233 (Step S34). In this case, without the use of a mold having a complex shape, the resin portion 233 can be easily molded by inserting the jig 7.

In addition, in this embodiment, the inner end portion of the teeth 42 is positioned closer to the inside in the radial direction than the inner end portion of the holder flat plate portion 222. Therefore, in Step S31, the first jig 71 can be inserted to the inside of the teeth 42 in the radial direction without coming into contact with the holder flat plate portion 222. Accordingly, the first jig 71 can be easily inserted to the inside of the teeth 42 in the radial direction.

However, the radial position of the inner end portion of the teeth 42 and the radial position of the inner end portion of the holder flat plate portion 222 may be substantially the same. In this case, the outside diameter of the first jig 71 and the inside diameter of the holder flat plate portion 222 become substantially the same. Therefore, the molding material can be suppressed from leaking toward the upper side of the holder flat plate portion 222 from between the inner end portion of the holder flat plate portion 222 and the outer circumferential surface of the first jig 71. Accordingly, it is possible to omit the second jig 72. In this case, it is preferable that the first jig 71 be formed of a material having elasticity such as an elastomer. Therefore, the molding material can be further suppressed from leaking toward the upper side of the holder flat plate portion 222 from between the inner end portion of the holder flat plate portion 222 and the outer circumferential surface of the first jig 71.

3. Modified Example

While the exemplary embodiments of the present invention have been described above, the present invention is not limited to the above-described embodiments.

For example, in Step S32 described above, to substitute gas in the stator holder with the molding material more efficiently, a through-hole for degassing may be provided in the stator holder. For example, a through-hole that penetrates in the up and down direction may be provided in the holder flat plate portion.

In addition, in the embodiments described above, both the lower surface of the housing flat plate portion and the upper surface of the holder flat plate portion are flat surfaces. However, the lower surface of the housing flat plate portion and the upper surface of the holder flat plate portion may be uneven surfaces so that the uneven surfaces come into contact with each other. In this case, the contact area between the housing flat plate portion and the holder flat plate portion can be increased. Therefore, heat can be more efficiently conducted to the housing flat plate portion from the holder flat plate portion.

In addition, in the embodiments described above, the upper surface of the holder flat plate portion and the lower surface of the housing flat plate portion come in direct contact with each other. However, a high thermal conductive sheet or a high thermal conductive adhesive may be interposed between the upper surface of the holder flat plate portion and the lower surface of the housing flat plate portion.

In addition, in the embodiments described above, the holder flat plate portion is pressed against the housing flat plate portion by fastening the cover to the housing. However, the holder flat plate portion may be pressed against the housing flat plate portion by another method. For example, by directly fastening the holder flat plate portion and the housing flat plate portion to each other by a fastening member, the holder flat plate portion may be pressed against the housing flat plate portion.

In addition, in the embodiments described above, the magnitude relation between the thicknesses or the distances of the parts is specified. However, the thicknesses and the distances of the parts may be different from those in the embodiments described above. In addition, the detailed shape of each member may also be different from the shape illustrated in each diagram of the present application. In addition, the elements that are described in the embodiments or the modified example described above may be appropriately combined in a range that does not cause contradictions.

At least an embodiment of the present invention may be used for a motor or a method of manufacturing the motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
    a stationary section;
    a rotating section; and
    a bearing mechanism which supports the rotating section to rotate relative to the stationary section about a center axis that extends up and down,
    wherein the stationary section comprises:
        a housing which is made of metal and supports the bearing mechanism,
        a stator holder which is made of metal and is disposed in the housing,
        a stator which is held in the stator holder, and
        a flow path for a cooling fluid, which is provided between the housing and the stator holder,
    wherein the stator comprises:
        a stator core which includes a core-back which is annular about the center axis, and a plurality of teeth which extend toward an inside in a radial direction from the core-back,
        a coil which is made of a conducting wire wound around the teeth, and
        a resin portion which covers the coil,
    wherein the housing comprises:
        a housing cylindrical portion which is positioned closer to an outside in the radial direction than the stator and is substantially cylindrical while extending in an axial direction, and
        a housing flat plate portion which widens toward the inside in the radial direction from the housing cylindrical portion on a side upper than the stator, and supports the bearing mechanism,
    wherein the stator holder comprises:
        a holder cylindrical portion which is positioned closer to the outside in the radial direction than the stator and closer to the inside in the radial direction than the housing cylindrical portion, and is substantially cylindrical while extending in the axial direction, and a holder flat plate portion which is positioned on a side upper than the stator and on a side lower than the housing flat plate portion, is unitary with the holder cylindrical portion as one piece, and widens toward the inside in the radial direction from the holder cylindrical portion, wherein an inner end portion of the holder flat plate portion is positioned closer to the inside in the radial direction than an outer end portion of the coil, wherein an upper surface of the holder flat plate portion and a lower surface of the housing flat plate portion contact each other, wherein the resin portion contacts a lower surface of the holder flat plate portion, wherein the holder cylindrical portion includes a protrusion which protrudes inward in the radial direction on a side upper than the stator core and on a side lower than the holder flat plate portion, wherein an upper surface of the stator core and a lower surface of the protrusion contact each other, and wherein an inside diameter of the protrusion is greater than or equal to an inside diameter of the core-back.

2. The motor according to claim 1,
wherein the holder flat plate portion is pressed against the housing flat plate portion using a fastening member.

3. The motor according to claim 1,
wherein the conducting wire that forms the coil is wound around a periphery of the teeth in multiple layers, and
wherein the inner end portion of the holder flat plate portion is disposed closer to the inside in the radial direction than an end portion of the conducting wire wound around an outermost layer of an upper surface of the coil in the radial direction.

4. The motor according to claim 3,
wherein the inner end portion of the holder flat plate portion is positioned at a same radial position as an inner end portion of the coil or is positioned closer to the inside in the radial direction than the inner end portion of the coil.

5. The motor according to claim 1,
wherein each of the lower surface of the housing flat plate portion and the upper surface of the holder flat plate portion includes a cut surface, and at least a portion of the cut surface of the housing flat plate portion and a portion of the cut surface of the holder flat plate portion come into contact with each other.

6. The motor according to claim 5,
wherein the lower surface of the housing flat plate portion has a concave portion which is recessed upward from the cut surface on the inside in the radial direction.

7. The motor according to claim 1,
wherein an axial thickness of the holder flat plate portion is smaller than a radial thickness of the holder cylindrical portion.

8. The motor according to claim 1,
wherein an axial thickness of the housing flat plate portion is greater than an axial thickness of the holder flat plate portion.

9. The motor according to claim 1,
wherein the housing flat plate portion contacts an outer circumferential surface of the bearing mechanism,
wherein the bearing mechanism is positioned closer to the inside in the radial direction than the coil, wherein the flow path is positioned closer to the outside in the radial direction than the coil, and
wherein a radial distance between the outer circumferential surface and the coil is longer than a radial distance between the coil and the flow path.

10. The motor according to claim 1,
wherein an inner circumferential surface of the holder cylindrical portion and the lower surface of the holder flat plate portion are connected to each other with a curved surface.

11. The motor according to claim 1,
wherein the flow path is provided between the housing cylindrical portion and the holder cylindrical portion.

12. The motor according to claim 11,
wherein the flow path is formed between a flow path groove provided in an outer circumferential surface of the holder cylindrical portion and an inner circumferential surface of the housing cylindrical portion.

13. The motor according to claim 11,
wherein an upper end portion of the flow path is positioned closer to an upper side than an upper surface of the stator core.

14. The motor according to claim 11,
wherein an O-ring is interposed between the housing flat plate portion and the holder flat plate portion, or between the housing cylindrical portion and the holder cylindrical portion on a side upper than an upper end portion of the flow path.

15. The motor according to claim 14,
wherein an annular groove is provided in the lower surface of the housing flat plate portion, and
wherein the O-ring is accommodated in the annular groove.

16. The motor according to claim 1,
wherein an inner end portion of the resin portion and inner end portions of the teeth are positioned closer to the inside in the radial direction than the inner end portion of the holder flat plate portion.

17. A method of manufacturing a motor, comprising:
a) inserting a stator core of a stator into a stator holder;
b) mounting a coil to teeth provided on the stator core;
c) injecting a molding material between the stator core, the coil, and the stator holder to solidify, thereby obtaining a resin portion; and
d) inserting the stator holder into a housing,
wherein the housing comprises:
a housing cylindrical portion which is positioned closer to an outside in a radial direction than the stator and is substantially cylindrical while extending in an axial direction, and
a housing flat plate portion which widens toward an inside in the radial direction from the housing cylindrical portion on a side upper than the stator, and
wherein the stator holder comprises:
a holder cylindrical portion which is positioned closer to the outside in the radial direction than the stator and closer to the inside in the radial direction than the housing cylindrical portion, and is substantially cylindrical while extending in the axial direction, and
a holder flat plate portion which is positioned on a side upper than the stator and on a side lower than the housing flat plate portion, is unitary with the holder cylindrical portion as one piece, and widens toward the inside in the radial direction from the holder cylindrical portion, wherein the stator core includes a core-back which is annular about a center axis, and a plurality of teeth which extend toward an inside in the radial direction from the core-back, wherein the holder cylindrical portion includes a protrusion which protrudes inward in the radial direction on a side upper than the stator core and on a side lower than the holder flat plate portion, wherein an upper surface of the stator core and a lower surface of the protrusion contact each other, and wherein an inside diameter of the protrusion is greater than or equal to an inside diameter of the core-back.

18. The manufacturing method according to claim 17, wherein the injecting a molding material comprises:

c-1) inserting a substantially columnar jig to an inside of the teeth in the radial direction;

c-2) injecting the molding material into a space surrounded by the stator core, the coil, the stator holder, and the jig;

c-3) allowing the molding material to solidify, thereby obtaining the resin portion; and c-4) pulling out the jig.

19. A motor comprising:

a stationary section;

a rotating section; and a bearing mechanism which supports the rotating section to rotate relative to the stationary section about a center axis that extends up and down, wherein the stationary section comprises:
- a housing which is made of metal and supports the bearing mechanism,
- a stator holder which is made of metal and is disposed in the housing,
- a stator which is held in the stator holder, and
- a flow path for a cooling fluid, which is provided between the housing and the stator holder, wherein the stator comprises:
- a stator core which includes a core-back which is annular about the center axis, and a plurality of teeth which extend toward an inside in a radial direction from the core-back,
- a coil which is made of a conducting wire wound around the teeth, and
- a resin portion which covers the coil, wherein the housing comprises:
- a housing cylindrical portion which is positioned closer to an outside in the radial direction than the stator and is substantially cylindrical while extending in an axial direction, and
- a housing flat plate portion which widens toward the inside in the radial direction from the housing cylindrical portion on a side upper than the stator, and supports the bearing mechanism, wherein the stator holder comprises:
- a holder cylindrical portion which is positioned closer to the outside in the radial direction than the stator and closer to the inside in the radial direction than the housing cylindrical portion, and is substantially cylindrical while extending in the axial direction, and
- a holder flat plate portion which is positioned on a side upper than the stator and on a side lower than the housing flat plate portion, is unitary with the holder cylindrical portion as one piece, and widens toward the inside in the radial direction from the holder cylindrical portion, wherein an inner end portion of the holder flat plate portion is positioned closer to the inside in the radial direction than an outer end portion of the coil, wherein an upper surface of the holder flat plate portion and a lower surface of the housing flat plate portion contact each other, wherein the resin portion contacts a lower surface of the holder flat plate portion, and wherein an axial thickness of the holder flat plate portion is smaller than a radial thickness of the holder cylindrical portion.

* * * * *